(12) United States Patent
Lecheler et al.

(10) Patent No.: US 7,045,970 B2
(45) Date of Patent: May 16, 2006

(54) ELECTRONIC BALLAST FOR A LAMP TO BE OPERATED WITH ITERATIVE VOLTAGE PULSES

(75) Inventors: Reinhard Lecheler, Neuburg/Donau (DE); Oskar Schallmoser, Augsburg (DE)

(73) Assignee: Patent - Treuhand Gesellschaft fur Elektrische - Gluhlampen mbH, Munich (DE)

( * ) Notice: Subject to any disclaimer, the term of this patent is extended or adjusted under 35 U.S.C. 154(b) by 63 days.

(21) Appl. No.: 10/899,040

(22) Filed: Jul. 27, 2004

(65) Prior Publication Data

US 2005/0035722 A1 Feb. 17, 2005

(30) Foreign Application Priority Data

Aug. 11, 2003 (DE) .................. 103 36 858

(51) Int. Cl.
*H05B 41/16* (2006.01)

(52) U.S. Cl. ............ 315/274; 315/276; 315/278; 315/209 R; 315/224

(58) Field of Classification Search ............. None
See application file for complete search history.

(56) References Cited

U.S. PATENT DOCUMENTS

| 4,670,662 | A | * | 6/1987 | Goldstein et al. ........... 307/106 |
| 4,706,153 | A | * | 11/1987 | Sainomoto et al. ........... 361/42 |
| 5,945,786 | A | * | 8/1999 | Jurek ........................ 315/276 |
| 2003/0174522 | A1 | * | 9/2003 | Xu et al. ..................... 363/22 |
| 2004/0183455 | A1 | * | 9/2004 | Schallmoser ................ 315/120 |
| 2005/0035719 | A1 | * | 2/2005 | Dellian et al. .............. 315/244 |

* cited by examiner

*Primary Examiner*—Tuyet Thi Vo
(74) *Attorney, Agent, or Firm*—Carlo S. Bessone

(57) ABSTRACT

The invention relates to an electronic ballast for a dielectrically impeded discharge lamp (L), which ballast has an inductor (W1, W2, W3) with a winding (W2) that can be short-circuited.

18 Claims, 4 Drawing Sheets

ELECTRONIC BALLAST FOR A LAMP TO BE OPERATED WITH ITERATIVE VOLTAGE PULSES

FIELD OF THE INVENTION

The present invention relates to an electronic ballast for a lamp, specifically in particular for a (so-called "silent") discharge lamp designed for dielectrically impeded discharges.

BACKGROUND OF THE INVENTION

Such discharge lamps are known per se. They need to be operated by an electronic ballast that can iteratively apply high-voltage pulses to the discharge lamp. The invention is, however, also directed toward ballasts for other lamp types that can be operated with iteratively generated voltage pulses, specifically in particular to lamps or lamps connected up in such a way that a capacitive characteristic prevails as in the case of dielectrically impeded discharges.

It is, furthermore, known per se to make use of inductors in ballasts for the purpose of generating high-voltage pulses and to generate the desired voltage pulses by means of various transformer concepts, for example so-called forward transformers or isolating transformers. In this case, the inductor can be a simple throttle with taps for a supply circuit and for a lamp circuit including the lamp, or else a so-called autotransformer or, preferred in this case, an isolating transformer. The supply circuit applies current to the inductor and can in this case preferably be switched by a switch denoted here as first switch (primary circuit switch in the case of a transformer).

SUMMARY OF THE INVENTION

The invention is based on the technical problem of further developing this general concept of a ballast.

According to the invention provision is made for this purpose of a second winding, which can be short-circuited at low resistance via a controllable second switch, for the purpose of generating an operating phase of the ballast in which the second winding is short-circuited at low resistance.

The invention is also directed toward a method for designing a ballast and an illuminating system.

Consequently, the invention is distinguished by the possibility of short-circuiting a winding of the inductor. Of course, in reality this short-circuit has a certain ohmic resistance other than zero, but is intended to be of low resistance by comparison with the remaining impedances in order to be able to fulfill the action explained in more detail below. The low-resistance short-circuiting of the winding prevents or limits an induced voltage across this winding to a very small value. The result is that the magnetic flux permeating the second winding is substantially constant with time, that is to say changes only very slowly with time in relation to other participating time characteristics. In graphic terms, thus, it is possible in the case of the ballast according to the invention for the flux permeating the second winding to be "frozen". Moreover, in this case the second winding can also be a part of the first winding, or vice versa, and thus differ from the first winding by one or the taps. However, it can also be an actual second winding.

Consequently, a new degree of freedom that can be used according to the invention in the most varied way results for the designer and for the operation of the ballast.

For example, said operating phase can be used to trigger the operation of the ballast by an external signal. This aspect is set forth in more detail in a parallel application. In this case, the trigger signal can be used, for example, in a final instant of said operating phase. This aspect of the invention is explained in more detail in the parallel application from the same applicant, which is being filed at the same time.

On the other hand, by freezing the magnetic flux through the second winding, it is possible if desired largely to suppress magnetic reactions of the core (at least with reference to the magnetization inductor of the second winding). Consequently, it is solely the leakage inductances present in the case of real inductors that remain decisive during short-circuiting.

In particular, it is possible for the capacitive charges important chiefly in the case of discharge lamps designed for dielectrically impeded discharges to be discharged by the abovementioned voltage pulse after the ignition, the aim being to short-circuit the second winding. Specifically, the consequence of this is that the discharging of the capacitive charge of the lamp is braked only by the leakage inductance (the direction of the primary side seen from the lamp circuit), and otherwise there is a transformation between the lamp circuit and the primary circuit (the term primary circuit not necessarily pre-supposing an actual transformer) through the actual transformer of the inductance, that is to say in the sense of an equivalent circuit diagram through the voltage and current transformation effected by the inductor without magnetization inductance. It is thereby possible for the magnetization fluxes through the core of the inductor to be kept low, as a result of which the core, and therefore the inductor as a component, can be of small design.

In the case of this invention, use is to be made, in particular, of transformers, preferably isolating transformers (it being possible for the "second winding" to be designed as part of one of its two windings, or separately). If relatively small values are achieved as voltage/time integrals or for the magnetization fluxes in the transformer core, because the discharging of the lamp takes place quickly enough, and thus no further voltage unnecessary for the actual production of light, particularly in dielectrically impeded discharges, is present across the transformer, it is thus possible to build particularly small transformers in ballasts according to the invention. In addition to cost advantages, this chiefly has substantial advantages for the overall size and weight of the equipment, which is largely determined by the transformer.

Specifically, "switching-off" the magnetization inductance of the transformer (or—in more general terms— "switching-off" the inventive inductance, no further distinction being made therebetween below, without imposing limitation) permits the effective inductance of the transformer to be reduced in terms of circuitry during the discharging process and, thereby, permits a corresponding shortening of the effective time constant, or an increase in the effective natural frequency of the lamp circuit.

In particular, this invention gives preference to the forward transformer concept, in the case of which there is fed into the inductor, that is to say into the first winding, a current that isochronously builds up an induction voltage in the lamp circuit (in a "third" winding that need not be an independent third winding, but can also be distinguished only by its taps from the first and second winding). Such forward transformers are conventionally associated with significant switching losses in the circuits applied to the first winding, chiefly in the case of average and relatively high lamp powers in conjunction with a capacitive characteristic. However, according to the invention the current flowing through the first winding can be "taken over" by the second winding with the short-circuiting switch closed, and so it is not possible for any substantial induced voltage to build up at a "first" switch in the primary circuit. The concept according to the invention thus permits switching to be performed largely without loss in the primary circuit.

Preferably, but not necessarily, the first switch is switched on approximately at the zero crossing of the lamp voltage and, likewise preferably, reopened at the zero crossing following thereupon after a polarity reversal operation, that is to say a change in sign of the current by the first switch. In turn, the short-circuiting switch is preferably switched on approximately at the maximum of the lamp voltage, once again after a polarity reversal of the same, that is to say a change in sign and, likewise preferably, reopened approximately at the zero crossing of the current through the second winding and the short-circuiting switch. Reference is made to the exemplary embodiment for the purposes of illustration.

The inventive rapid decrease in the capacitive charge of the lamp can preferably be caused by an inner back ignition as a consequence of the inner counterpolarization of the lamp, which for its part can effect a new ignition voltage. Reference is made for this purpose to the earlier application EP 99 953 611 from the same applicant.

This back ignition can follow a "forward ignition", that is to say an ignition originating from the actual forward transformer pulse, because the secondary circuit swings back correspondingly quickly. However, it is also possible for the second winding to be short-circuited in a somewhat time-delayed fashion. In this case, it would firstly be possible in some circumstances for the "forward ignition" to be followed by a first back ignition that is caused by the flowing away of the outer charge on the discharge lamp and the consequential effectiveness of the inner counterpolarization. If, then, the short-circuit of the second winding is produced, the natural frequency of the secondary circuit is suddenly greatly increased, thus rendering possible a (further) violent oscillation process that effects a (further) back ignition. Thus, a back ignition can also be triggered by the short-circuiting of the second winding. In the case of this variant, as well, the transformer is effectively and quickly demagnetized after this "triggered" back ignition such that the aims of the invention are achieved.

Further, it is preferred as a whole not to allow too many further ignitions (which are to be assigned to the same forward transformer pulse) after the forward ignition, because it is advantageous for the efficiency of the generation of light in dielectrically impeded discharge lamps to permit a certain "dead time" to elapse up to the next ignition operation after an ignition or, in the present case, back ignition. Consequently the short-circuiting switch is preferably reopened after the "triggered" back ignition, in order to prevent further ignition.

Finally, it is also possible for the time period between the closure of the short-circuited switch and the last preceding ignition, that is to say the forward ignition or a back ignition following spontaneously thereupon, to become so large that it can be evaluated as dead time in the sense of the pulsed mode of operation of dielectrically impeded discharge lamps.

The short-circuiting switch can be connected to the second winding, that is to say connected in parallel with it, via a diode of the short-circuiting switch that is oppositely polarized to a parasitic transistor diode (body diode of a MOSFET). This diode prevents undesired influences of the body diode via the second winding. However, it is also possible to use a diode bridge that permits the short-circuiting switch to be used in phases of both polarities. Furthermore, instead of the diode bridge it is possible to short-circuit the second winding via a reference potential by using a respective switch at both its terminals, for example by connection to frame. It is true that this embodiment requires two short-circuiting switches instead of one short-circuiting switch. On the other hand, by contrast with the previously mentioned embodiment with a diode bridge, these short-circuiting switches can be driven via a temporarily constant and defined reference potential. In the case of a diode bridge, the reference potential of the control electrode, (for example the gate) of the short-circuiting switch fluctuates depending on polarity, that is to say depending on whether the positive or the negative polarity is present at source or at drain, or at emitter or collector of the short-circuiting switch.

The second winding, which can be an independent winding or only a further tap at the inductor, in particular the transformer, is preferably designed such that maximum reverse voltages of possibly 500–800 V occur at most at the short-circuiting switch. On the one hand, the second winding should not generate any excessively low voltages at the short-circuiting switch, because this would conversely entail relatively high induced currents in the relevant shorted circuit. These short-circuit currents would be associated with undesired ohmic losses. On the other hand, it is desired not to permit the voltages across the short-circuiting switch to become too high, so as not to have to use excessively expensive transistors. The mentioned range of between 500–800 V has proved to be a favorable compromise.

It has already been mentioned that the invention permits a slight core saturation in the inductor or the transformer and, in particular, allows the use of small inductors or transformers. It is preferred here not to drive the core into saturation. In particular, it is preferred to keep the saturation of the core as far as possible below 100 mT. Although it is also possible deliberately to desire to produce a core saturation in order to utilize the reduction in inductance caused thereby, this creates a dependence on individual parameters of the inductor used, and also on operating conditions, in particular the temperature, which is not desired within the scope of this invention. Instead of this, the aim is for it to be possible to design the ballast according to the invention as far as possible by the drive of the switch or switches used, and also, furthermore, to design it as universally as possible for various applications.

Furthermore, a bipolar ballast is preferred, that is to say a design for voltage pulses of alternating polarity in the lamp circuit is preferred. It is thereby possible to avoid an integration, occurring over time, of instances of residual magnetization in the inductor or its core by incomplete demagnetization in a single work cycle, and to achieve a mean zero magnetization in a steady state of the bipolar operation.

Within the scope of the abovementioned driving of the switch or switches for adaptation to the individual application, consideration is given, in particular, to controlling the short-circuiting switch by means of the microcontroller and, if appropriate, also the primary circuit switch. When designing such a ballast for a specific lamp type, it is possible in the most preferable case to adapt merely the software of the microcontroller and otherwise to use a circuit with identical hardware for different lamp types.

Finally, the invention exhibits its advantages precisely in conjunction with a dielectrically impeded discharge lamp, and is therefore also directed toward an illuminating system composed of such a lamp and a ballast in accordance with the above description. The already mentioned leakage inductance (from the point of view of the lamp circuit) should preferably be designed in the case of such an illuminating system so that a period of at least 0.4 μs, preferably at least 1 μs, and at most 10 μs, preferably at most 5 μs results from the leakage inductance and the capacitance of the lamp used.

BRIEF DESCRIPTION OF THE DRAWINGS

A preferred exemplary embodiment of the invention is explained below, it also being possible for the features described here to be essential to the invention in other combinations, and otherwise to relate both to the inventive ballast and illuminating system, that is to say the device category, and to the method category of the invention.

In the drawings.

DETAILED DESCRIPTION OF THE INVENTION

Figure 1:
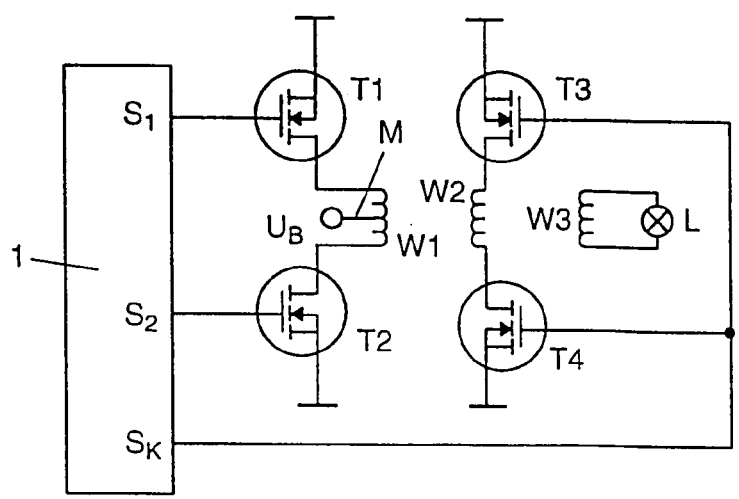
FIG. 1 shows a schematic circuit diagram of an inventive electronic ballast and illuminating system.

In FIG. 1, the numeral 1 denotes an electronic control with three outputs $S_1$, $S_2$ and $S_K$. In concrete terms, the control 1 is a microcontroller. An isolating transformer has three windings W1, W2 and W3, that are, in the meaning of the previous description, the first, second and third windings, respectively. The third winding is therefore connected into the lamp circuit, that is to say to a dielectrically impeded discharge lamp L. The first winding W1 is in each case connected at its two ends via a switching transistor T1 and T2, respectively, to frame, and to a supply potential $U_B$ via a center tap M. It is thereby possible to apply voltage to the first winding W1 in an alternating fashion with reference to the polarity, and induced pulses of alternating polarity can be induced in the third winding W3 in accordance with the forward transformer principle. The two switching transistors T1 and T2 can be driven in this case via the control inputs $S_1$, and $S_2$ with reference to frame in terms of potential.

The second or short-circuit winding W2 is connected for its part to frame in each case at both ends via two switching transistors T3 and T4. The two switching transistors T3 and T4 are driven by the same control output $S_K$ of the electronic control 1. The short-circuit winding W2 is therefore short-circuited or open at its two ends depending on the drive via $S_K$.

Figure 2:
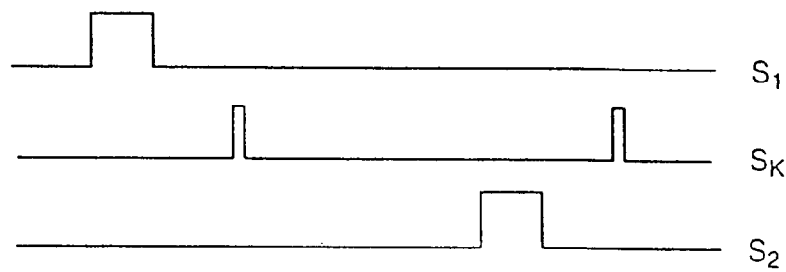
FIG. 2 shows a schematic timing diagram of control signals of the circuit from FIG. 1.

The electronic ballast having the circuit illustrated schematically in FIG. 1 can therefore apply voltage pulses in a way known per se to the discharge lamp L via the isolating transformer W1, W2, W3, and cause it to shine in accordance with a pulsed operating method likewise known per se. This results in the time profiles, illustrated schematically in FIG. 2, of the drive signals $S_1$ and $S_2$ for the driving of the switching transistors T1 and T2. FIG. 2 also shows the drive signal $S_K$ for the switching transistors T3 and T4, that is to say for the short-circuiting of the short-circuit winding. This short-circuiting takes place after injection of a voltage pulse from the first winding W1 into the third winding W3, and thus into the lamp circuit in accordance with the forward transformer principle.

Figure 3:
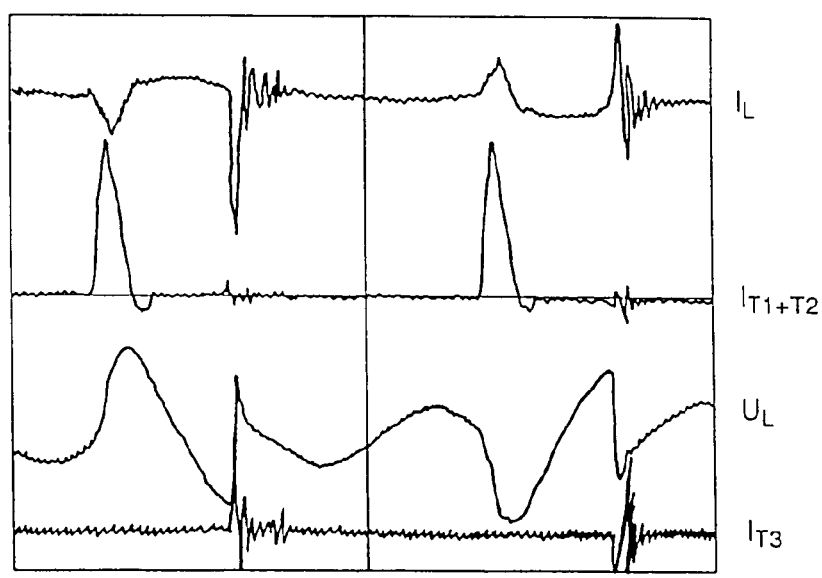
FIG. 3 shows the timing diagrams of various electrical quantities of the circuit from FIG. 1 as measurement records with reference to FIG. 2.

FIG. 3 shows the essential electric processes with the aid of actual measuring curves.

Depicted at the bottom is the current through the short-circuiting switches T3 and T4, which is denoted here by $I_{T3}$. Directly after the short-circuit, this current $I_{T3}$ exhibits a prominent pulse that then decays. No role is played by the oscillations occurring after opening of the short-circuiting switch.

Above this will be seen, in turn, the lamp voltage $U_L$ present across the discharge lamp L, and above that, in turn, the current $I_L$ through the discharge lamp L. Referring to the left-hand part of FIG. 3, what is firstly to be seen is a pronounced, steeply starting and positive deflection of the lamp voltage $U_L$. This is the forward transformer pulse occurring as a consequence of the switching-on operation of the switching transistor $T_1$. Said pulse generates the lamp voltage illustrated, which is associated with an ignition and a corresponding deflection in the lamp current $I_L$. It is further to be seen that as the lamp voltage $U_L$ decays, there is no substantial lamp current pulse of opposite polarity that could be ascribed to a spontaneous back ignition after a partial flowing off of the outer charge at the discharge lamp L and a field corresponding thereto as a consequence of the inner polarization after the first ignition process. Such a pulse would, however, be entirely possible.

In the further time profile, the lamp circuit overswings such that a negative lamp voltage $U_L$ occurs. If this oscillation process were to be allowed to continue, relatively large time integrals of the voltage, and thus magnetizations in the transformer, would occur. Specifically, dielectrically impeded discharge lamps in particular have a substantial capacitive load component, particularly in the case of larger lamps. In addition to the capacitance of the discharge vessel and the dielectric barrier, couplings to the surroundings must also be counted in here. However, instead of this the $S_K$ pulse to be seen in FIG. 2 produces a short-circuit in the transformer that is to be seen in the pulse of the current $I_{T3}$. At the same time, the lamp voltage $U_L$ drops very quickly because the natural frequency of the lamp circuit has increased drastically. As the $I_L$ curve shows, this renewed action of charges flowing off quickly from the discharge lamp L leads to a further ignition. Following thereupon, furthermore, are substantially smaller time integrals of the lamp voltage $U_L$, and thus of the voltage across the third winding W3. The core magnetization can thus be substantially limited by the short-circuiting switch.

Figure 4A:
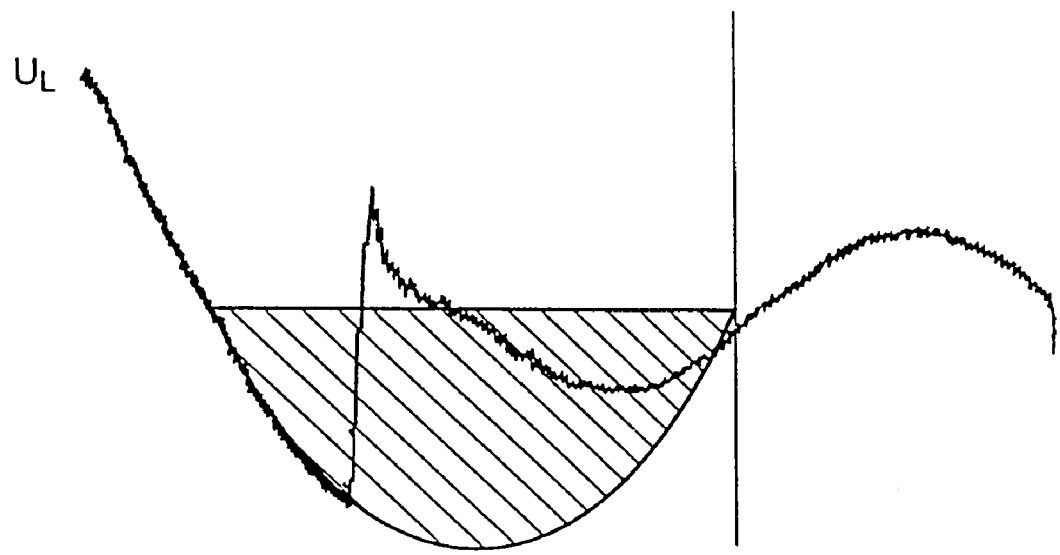
FIG. 4a shows a detail from FIG. 3 for the purpose of explaining an aspect of the invention.
Figure 4B:
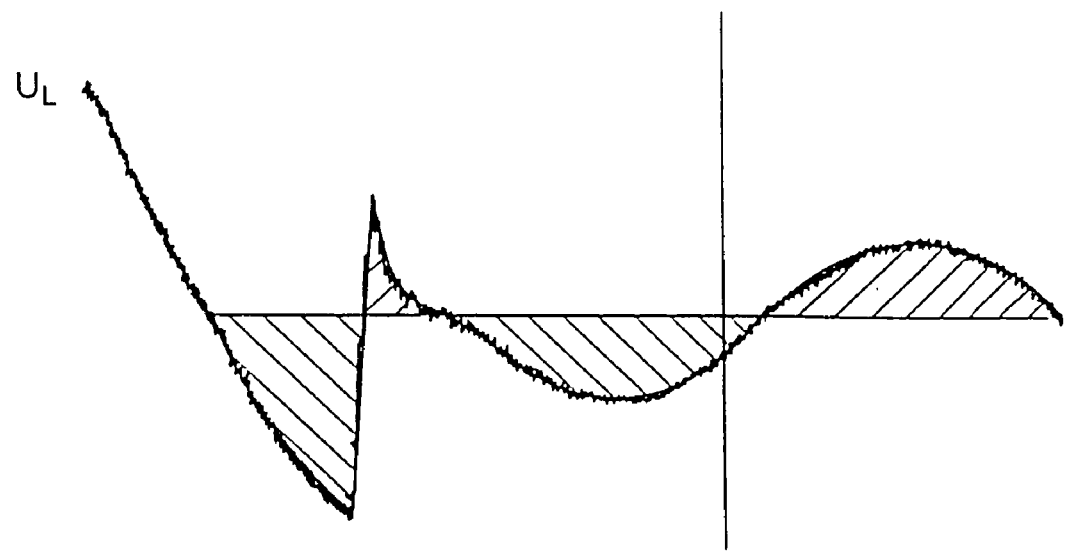
FIG. 4b shows another detail from FIG. 3 for the purpose of explaining an aspect of the invention.

FIGS. 4a and 4b show corresponding details of the lamp voltage curve from FIG. 3, an integral of an oscillating process of the lamp voltage running without a short-circuiting switch being indicated in FIG. 4a, while FIG. 4b shows the integrals actually occurring in FIG. 3. It is to be seen that a substantially larger voltage time integral builds up without a short-circuiting switch. In the lower part, the build up of this integral is substantially limited by the use of the short-circuiting switch (which roughly equates to ⅓at an estimate), whereupon the short peak integral of opposite polarity already produces a decrease in the core magnetization. The flatter integral following thereupon is certainly added to this, but leads at its end in sum to a clearly smaller total value than in FIG. 4a. The last sign-inverted integral following thereupon in FIG. 4b leads, in turn, to a decrease in the core magnetization.

These two flat integrals on the right correspond to a residual oscillation of the voltage in the lamp circuit that, however, is no longer attended by any substantial disadvantages, owing to their substantially smaller amplitude by comparison with the previous oscillation illustrated in FIG. 4a.

The corresponding processes are repeated after expiry of the dead time typical of the pulsed method. It has already been pointed out that the time period between the ignitions (which both ultimately originate from the same forward transformer pulse) can be set by the triggering of the second ignition process, that is to say the timing of the $S_k$ signal. In the present case, the ignitions are actually regarded as two power injection pulses separated from one another by a dead time. However, it would also be possible to execute the invention with very much shorter time periods between the ignitions, which could not then be classified as dead time.

By a comparison with FIGS. 2 and 3, it is seen that the first switch is switched on approximately at the zero crossing of the residual oscillation of the lamp voltage $U_L$, and is opened approximately at the zero crossing after the reversal of the current $I_{T1+T2}$. In this example, the short-circuiting switch is closed, in turn, at a maximum of the lamp voltage $U_L$ after the reversal in the lamp circuit (that is to say the transistors T3 and T4), and reopened approximately at the zero crossing of its current. These switching instants are not essential, however. It still needs to be noted in relation to the curve for the lamp current that for metrological reasons the measurement illustrated in FIG. 3 is displaced somewhat in the current direction by comparison to the horizontal axis, as can be read off by the comparison of the similar structures of reverse polarity. In fact, the transistors T3 and T4 are closed approximately at the zero point of the current $I_L$. After the "forward ignition pulse", the lamp current $I_L$ has executed a relatively weak half cycle up to this instant.

Figure 5:
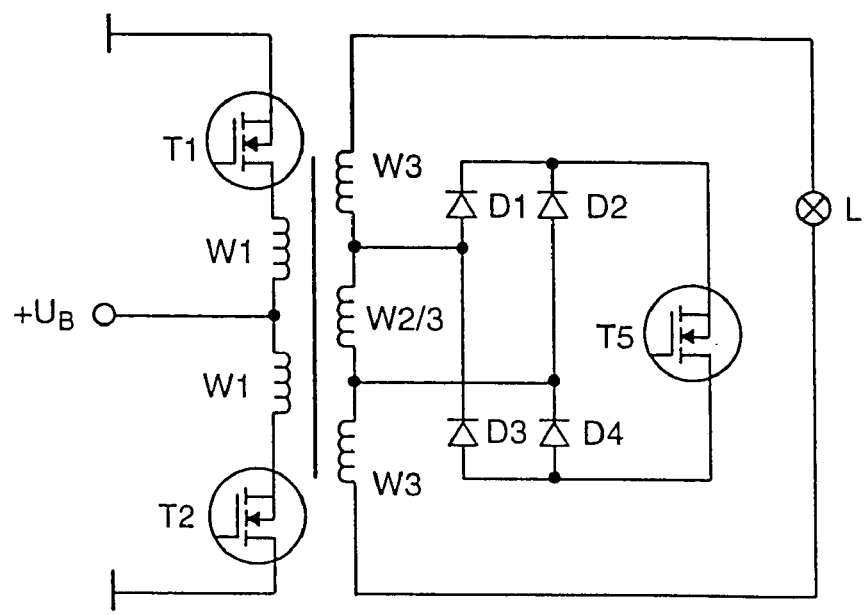
FIG. 5 shows a second exemplary embodiment as an alternative to FIG. 1.

The exemplary embodiment could also be implemented in the form of a single-ended converter or a half bridge instead of the push-pull converter illustrated here in FIG. 1. Furthermore, instead of the two switching transistors T3 and T4 it would also be possible to use a single short-circuiting switch T5 that is connected to the short-circuit winding via a diode bridge D1–D4, for example. FIG. 5 shows a schematic of an example for a push-pull converter having a diode bridge D1–D4 and FIG. 6 a schematic of an example of a half-bridge having a diode bridge D1–D4. The drive lines have been omitted for the sake of simplicity.

Figure 7:
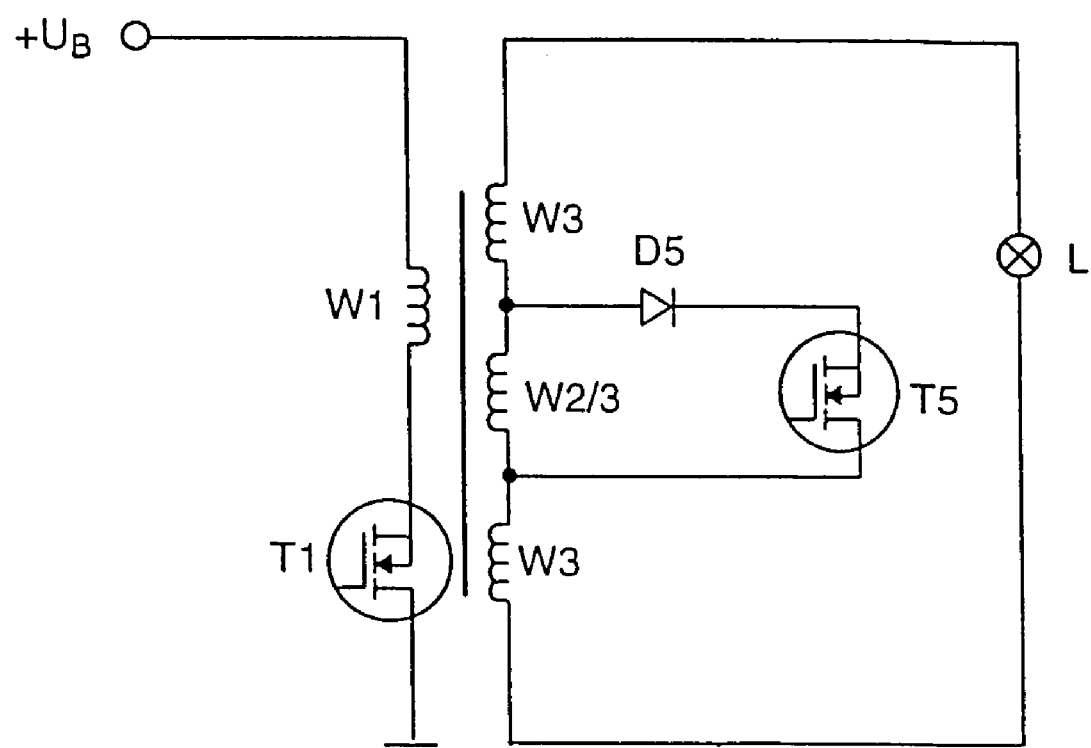
FIG. 7 shows a fourth exemplary embodiment as an alternative to FIG. 1.

Furthermore, FIG. 7 shows an example of a single-ended converter having a single decoupling diode D5 for connecting the short-circuiting switch T5. This diode D5 is polarized opposite to the parasitic transistor diode of the short-circuiting switch T5 such that inadvertent short-circuits can be avoided. Moreover, the diode bridges can be used for targeted control of oscillation reversal processes even with negative current components. The losses therein remain low because of the fact that the currents through the diodes D5 are low owing to the transformation ratio.

In order to limit the peak currents in the primary-side switches T1 and T2, the magnetic coupling of the first winding W1 can be executed deliberately in a weak fashion, for example by means of a suitable chamber design. This does not affect the magnetic coupling between the short-circuit winding W2 and the lamp tap.

Figure 6:
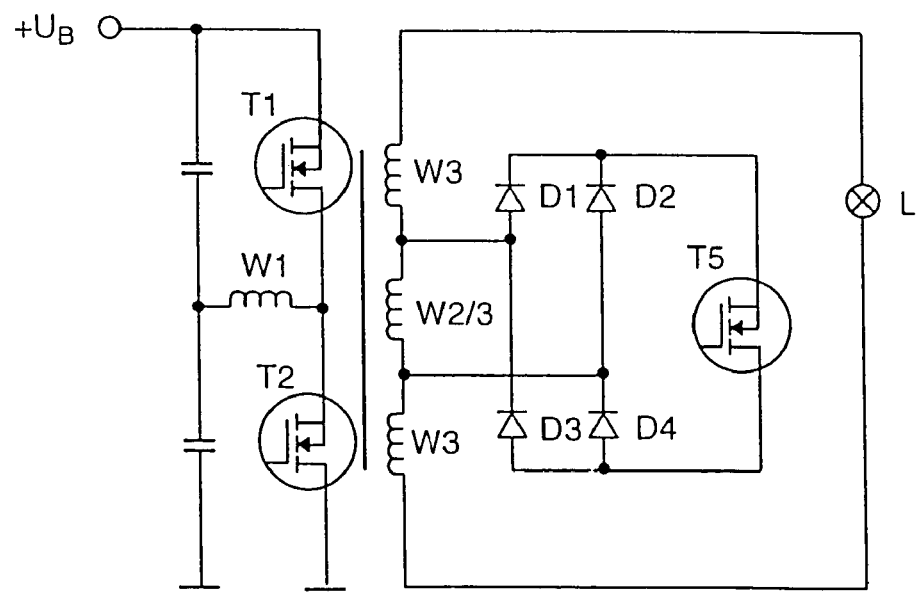
FIG. 6 shows a third exemplary embodiment as an alternative to FIG. 1.

The examples from FIGS. 5, 6 and 7 show, furthermore, that the short-circuit winding W2 can be part of the winding W3 on the side of the secondary circuit. In particular, the magnitude of the voltages occurring across the short-circuiting switch T5 can be set in this case, a range of between 600–800 V being preferred.

In these examples, the saturations of the transformer core remain substantially below 100 mT, something which is preferred in accordance with the invention.

The basic idea of the invention can also be applied to other cases in which a lamp, in particular a lamp having a capacitive characteristic, is to be operated. The inventive short-circuiting phase can have various advantages, it also being possible in an individual case for aspects other than the limitation of the magnetization of the inductance to occupy the foreground. In particular, this relates to the temporal control of the operation, for example in the exemplary embodiment to the temporal control of the ignition following the short-circuiting.

An important advantage of the invention consists, however, in that an individual adaptation of the electronic ballast to various types of discharge lamps L can be undertaken by the clocking of the drive signals $S_1$, and $S_2$ and, in particular, $S_K$. Thus, this adaptation can be performed purely by software without hardware adaptations.

The invention claimed is:

1. An electronic ballast for a lamp (L) having an inductor (W1, W2, W3) for generating iterative voltage pulses ($U_L$) in a lamp circuit including the lamp (L), which inductor (W1, W2, W3) has a first winding (W1) to which current is applied by a voltage source ($U_B$), characterized by a second winding (W2), which is short-circuited via a controllable short-circuiting switch (T3, T4, T5), for the purpose of generating an operating phase of the ballast in which the second winding (W2) is short-circuited, a first switch (T1, T2) controlling the injection of the voltage pulses ($U_L$) is switched on approximately at a zero crossing of the lamp voltage ($U_L$) or is opened approximately at a current zero crossing.

2. The ballast as claimed in claim 1, which is provided for a discharge lamp (L) designed for dielectrically impeded discharges, and in the case of which ballast the second winding (W2) is short-circuited after the ignition performed by the voltage pulse ($U_L$), in order to discharge from the lamp (L) the capacitive charge caused by the voltage pulse ($U_L$).

3. The ballast as claimed in claim 1, in which the inductor (W1, W2, W3) is a transformer, preferably an isolating transformer.

4. The ballast as claimed in claim 1, which is designed as a forward transformer in order to generate the voltage pulses ($U_L$).

5. The ballast as claimed in claim 1, in which the short-circuiting switch (T3, T4, T5) is closed approximately at the voltage maximum in the lamp circuit.

6. The ballast as claimed in claim 1, in which the short-circuiting switch (T5) is switched parallel to the second winding (W2) via a diode (D5) that is polarized opposite to a parasitic transistor diode of the short-circuiting switch (T5).

7. The ballast as claimed in claim 1, in which the short-circuiting switch (T5) is connected in parallel with the second winding (W2) via a diode bridge (D1–D4).

8. The ballast as claimed in claim 1, in which via a respective switch (T3, T4), the second winding (W2) is short-circuited at both its connections via a reference potential.

9. The ballast as claimed in claim 1, in which the second winding (W2) is designed such that maximum reverse voltages in the range of 500–800 V occur at the short-circuiting switch (T5).

10. The ballast as claimed in claim 1, in which the saturation of a core of the inductor (W1, W2, W3) remains below 100 mT.

11. The ballast as claimed in claim 1, which is designed for generating voltage pulses ($U_L$) of alternating polarity.

12. The ballast as claimed in claim 1, in which, after the ignition caused by the injection of a voltage pulse ($U_L$) via the inductor (W1, W2, W3) before the injection of the next voltage pulse ($U_L$), there is a back ignition in the lamp (L).

13. The ballast as claimed in claim 12, in which the short-circuiting switch (T3, T4, T5) is opened after the back ignition.

14. The ballast as claimed in claim 1, in which the short-circuiting switch (T3, T4, T5) is controlled by a microcontroller (1).

15. The ballast as claimed in claim 14, in which, furthermore, a first switch (T1, T2) controlling the injection of the voltage pulses ($U_L$) is controlled by the microcontroller (1).

16. A method for designing a ballast as claimed in claim 15 for a specific lamp type (L), in which only the software of the microcontroller (1) is adapted.

17. An illuminating system comprising a ballast as claimed in claim 1 and a discharge lamp (L) designed for dielectrically impeded discharges.

18. The illuminating system as claimed in claim 17, in which a period of between 0.4 µs and 10 µs results from the leakage inductance of the inductor (W1, W2, W3) and the lamp capacitance of the discharge lamp (L).

* * * * *